(12) United States Patent
Fröschle

(10) Patent No.: US 7,600,804 B2
(45) Date of Patent: Oct. 13, 2009

(54) FOLDABLE VEHICLE TOP

(75) Inventor: Mathias Fröschle, Ostfildern (DE)

(73) Assignee: Dr. Ing. h.c. Porsche AG, Weissach (DE)

( * ) Notice: Subject to any disclaimer, the term of this patent is extended or adjusted under 35 U.S.C. 154(b) by 52 days.

(21) Appl. No.: 11/852,530

(22) Filed: Sep. 10, 2007

(65) Prior Publication Data

US 2008/0061594 A1    Mar. 13, 2008

(30) Foreign Application Priority Data

Sep. 8, 2006    (DE) ............... 10 2006 042 182

(51) Int. Cl.
 *B60J 7/08* (2006.01)
(52) U.S. Cl. .................. 296/107.07; 296/146.14; 296/201
(58) Field of Classification Search ........... 296/107.11, 296/107.07, 146.14, 201, 145, 147
See application file for complete search history.

(56) References Cited

U.S. PATENT DOCUMENTS

| | | | | |
|---|---|---|---|---|
| 5,460,424 | A | * | 10/1995 | Wagner ............. 296/146.14 |
| 5,507,729 | A | | 4/1996 | Lindenberg et al. |
| 6,464,285 | B1 | | 10/2002 | Schütt |
| 6,471,283 | B2 | | 10/2002 | Windpassinger et al. |
| 6,536,831 | B2 | | 3/2003 | Rothe et al. |

FOREIGN PATENT DOCUMENTS

| | | |
|---|---|---|
| DE | 4316330 A1 | 8/1994 |
| DE | 19914801 C1 | 7/2000 |
| DE | 10007575 A1 | 5/2001 |
| DE | 19956330 A1 | 5/2001 |
| DE | 20008096 U1 | 6/2001 |
| DE | 10029472 B4 | 11/2004 |

\* cited by examiner

*Primary Examiner*—Dennis H Pedder

(57) ABSTRACT

A foldable vehicle top contains a top cloth and a rear window. The rear window has an outer border with a window mount to which the top cloth is fastened. A frame is provided which, in a closed position, supports the top cloth and the rear window. The frame has a recess in which the window mount is accommodated in the closed position.

14 Claims, 1 Drawing Sheet

FOLDABLE VEHICLE TOP

CROSS-REFERENCE TO RELATED APPLICATION

This application claims the priority, under 35 U.S.C. § 119, of German application DE 10 2006 042 182.5, filed Sep. 8, 2006; the prior application is herewith incorporated by reference in its entirety.

BACKGROUND OF THE INVENTION

Field of the Invention

The present invention relates to a foldable vehicle top, in particular for a passenger vehicle. The vehicle top includes a top cloth and a rear window. The outer border of the rear window has a window mount to which the top cloth is fastened. A frame is provided which, in a closed position, supports the top cloth and the rear window.

In order to move a foldable vehicle top into a storage position and a closed position and to stiffen and tension it in the latter, it is basically known to provide a top linkage with bows. Furthermore, in order to enlarge the field of view, it is known to arrange a transparent rear window in the top.

In order to satisfy both functions together, German patent DE 100 29 472 B4, corresponding to U.S. Pat. No. 6,536,831, proposes a foldable vehicle top with a U-shaped frame on the rear side which can be controlled into a storage position and a closed position by a top linkage. A top cloth is fastened permanently or releasably to the frame by an adhesive bonding connection, screw connection, seam connection or clamping connection and is thus tensioned and stiffened by the frame which acts as part of the top linkage. A rear window is likewise fastened permanently or releasably by an adhesive bonding connection, screw connection or clamping connection to the frame which therefore serves both functions.

In order to seal off the top as a whole from the surroundings, this solution disadvantageously requires, however, a first tight-fitting connection between the frame and the top cloth fastened thereto, and an additional, second tight-fitting connection between the frame and the separately fastened rear window. These two connections first increase the outlay on production and removal/installation and, second, provide additional possible water entry points.

In a similar manner, published non-prosecuted German patent application DE 43 16 330 A1 proposes to fasten the top cloth to a frame, which is referred to as a window mount and, in the closed position, tensions the top cloth and, in this case, takes on the function of a corner bow. A rear window, for its part, is integrated into the frame in a manner not explained specifically.

Published, non-prosecuted German patent application DE 199 56 330 A1, corresponding to U.S. Pat. No. 6,464,285, also proposes fastening a rear window and top cloth in each case to a frame composed of an aluminum section.

All of the proposals mentioned each require a tight-fitting connection between the frame and the top cloth, on the one hand, and rear window, on the other hand.

It is known per se from German patent DE 199 14 801 C1, German Utility Model DE 200 08 096 U1 and published, non-prosecuted German patent application DE 100 07 575 A1 (U.S. Pat. No. 6,471,283) to connect the top cloth directly to the rear window of a vehicle top via a bead-shaped window mount. However, this solution cannot readily be used in the case of a rear window, which, for its part, is fastened to a frame, in accordance with the prior art explained at the beginning, since, in this case, the bead-shaped window mount prevents the fastening of the rear window and of the top cloth to the frame which is of flat configuration in order to support the top.

BRIEF SUMMARY OF THE INVENTION

It is accordingly an object of the invention to provide a foldable vehicle top which overcomes the above-mentioned disadvantages of the prior art devices of this general type, which has a simplified connection between a rear window and a top cloth which are both supported in the closed position by a frame.

With the foregoing and other objects in view there is provided, in accordance with the invention, a foldable vehicle top. The vehicle top contains a top cloth, a rear window having an outer border, a window mount fastened to the outer border and to the top cloth, and a frame. In a closed position, the frame supports the top cloth and the rear window. The frame has a recess formed therein in which the window mount is accommodated in the closed position.

According to the invention, the foldable vehicle top contains the top cloth and the rear window. The latter may be dimensionally stable or flexible and is preferably configured as a transparent glass or plastic window.

At its outer border, the rear window has a window mount which surrounds the rear window preferably along its upper and/or side edge(s). In a particularly preferred embodiment, the window mount encircles the rear window from its one corner region to its other lower corner region and only leaves free the rear window lower edge which faces the rear of the vehicle. The window mount may equally also be disposed along the entire outer circumference of the rear window.

The top cloth is fastened to the window mount in a manner described in more detail below. The rear window and the top cloth can therefore advantageously be connected in a simple and preferably tight-fitting manner to each other.

In the closed position, a frame supports the top cloth and thereby locally defines the outer contour thereof. Consequently, the frame can take on the function of a lateral tensioning bow, a main bow and, in particular, a corner bow.

According to the invention, the frame has a recess in which the window mount, which connects the rear window to the top cloth, is entirely or partially accommodated at least in the closed position. By this measure, it is advantageously possible also to use the direct connection which is known per se between the rear window and the top cloth via a window mount in a vehicle top with a frame which supports the rear window and the top cloth.

The solution according to the invention combines the advantages of both known proposals. First, the rear window and top cloth can be connected in a tight-fitting manner to each other in a simple manner. In particular, a separate seal between the frame and the rear window, on the one hand, and the top cloth, on the other hand, can be omitted. Nevertheless, in a preferred embodiment, a separate seal of this type can additionally be provided in order to further increase the seal tightness of the top. In such a case, it is also not necessary that the window mount, for its part, connects the rear window and the top cloth to each other in a tight-fitting manner.

On the other hand, the frame can advantageously take on the function of a top framework element, of controlling the rear window and, in the closed position, defining the contour of the top cloth. The frame can also serve to tension the top cloth at least in the last portion of a movement into the closed position.

In a preferred embodiment, the rear window and/or the top cloth is/are fastened nonreleasably to the window mount. This advantageously makes possible a particularly tight-fitting and/or fixed connection of the elements and, furthermore, can facilitate the installation. For this purpose, the rear window and/or the top cloth can be, for example, adhesively bonded, welded and/or sewn to the window mount.

In an advantageous development of this embodiment, the window mount is formed from a plastic, and therefore the rear window and/or the top cloth is/are foamed into the window mount, encapsulated therein by injection molding or the like by being placed into the mold during the production of the window mount.

In this case, the border of the rear window and/or of the top cloth, which border is integrated into the window mount during the production process, is preferably angled. This increases the strength of the connection and stops it from working its way out of the window mount. In an advantageous development, the border of the top cloth can be of correspondingly dimensionally stable construction for this purpose, for example can be reinforced by fastening metal or plastic strips in it. In addition or as an alternative, the border of the rear window and/or of the top cloth can have projections which interlock in the window mount in a form-fitting manner.

In an alternative embodiment of the present invention, the rear window and/or the top cloth is/are fastened releasably to the window mount. Rear window and/or top cloth and window mount can be connected, for example in a form-fitting manner, by introduction of a border region of the one partner into a corresponding recess of the other partner. In addition or as an alternative, they may be, for example, screwed to each other or clamped to each other in a frictional manner.

Both embodiments may also be combined, i.e. the window mount can be connected releasably to the top cloth and nonreleasably to the rear window or releasably to the rear window and nonreleasably to the top cloth. This combination combines the advantages of both embodiments: first, a simple and reliable connection of the elements connected nonreleasably to each other and, second, facilitating the removal/installation of the entire top by later connection of the releasable elements.

In a preferred embodiment, the window mount engages around the outer border of the rear window in a bead-shaped manner. This increases the seal tightness and strength of the connection and advantageously secures the top cloth additionally to the frame by the window mount engaging in a correspondingly complementary recess.

In the closed position, the window mount advantageously bears at least partially in the recess and, as a result, engages therein in a form-fitting manner. This supports the connection and reduces small movements of the top cloth in relation to the rear window, which movements can otherwise subject the connection to a load and reduce the service life of the top. In an alternative embodiment of the present invention, the side mount does not rest in the recess, which advantageously reduces the introduction of vibrations of the top into the vehicle body and therefore avoids annoying noises.

The frame is preferably connected to one or more links of a top linkage. As a result, it can be moved from a storage position into a closed position and back again. In particular, it is possible, by the corresponding articulation, to tension the top cloth.

In an advantageous embodiment of the present invention, the frame contains an upper transverse limb and/or one or two side limbs. This makes it possible to support the top cloth by a support in predetermined regions defined by the limbs, and thus permits virtually any desired shaping of the top contour. In a particularly preferred embodiment, the frame is of a generally U-shaped configuration, as seen in the longitudinal direction of the vehicle, and leaves the lower edge of the rear window free, since the top does not have to be supported here.

The frame is preferably of a fixed configuration, for example made of metal and/or plastic. In an advantageous embodiment, the frame is configured as an open profile with a first supporting surface for supporting the top cloth, a second supporting surface for supporting the rear window and a trough which connects the surfaces and defines the recess. An open profile of this type can provide relatively large supporting surfaces for supporting the rear window and/or the top cloth while at the same time providing a low frame weight. Relatively large supporting surfaces of this type reduce the surface load and therefore improve the introduction of force into the frame.

An open profile of this type can advantageously provide a sufficient degree of flexibility in order to compensate for small movements of the top cloth in relation to the rear window. The top cloth can therefore be adjusted in each case in the direction of force, which reduces the loading of the top cloth and of the window mount. In addition, the top cloth is more gently tensioned as it takes up the closed position.

In particular with regard to the taking up of the closed position, during which operation the first supporting surface comes into contact with the top cloth, in an advantageous development the first supporting surface can be angled at its end which faces away from the trough toward the inside of the vehicle. Such a bending or rounding advantageously avoids a stress concentration on the tensioned top cloth.

In a particularly preferred embodiment, in the closed position, the frame supports the top cloth and the rear window from the inside of the vehicle. The frame is therefore at least partially concealed by the top cloth and the window mount and does not disturb the uniform appearance of the vehicle top.

In an alternative refinement, the top frame can also support the rear window and the top cloth from the outside of the vehicle, which advantageously protects the window mount against environmental influences, in particular relative wind and rain.

In an advantageous development, the upper corner regions of the frame have expanded portions which support and tension the upper and/or lateral rear region of the top cloth. According to this embodiment, the frame therefore advantageously takes on the function of a corner bow.

The frame is preferably connected fixedly to the rear window. The latter can be, in particular, adhesively bonded, screwed or clamped to the frame.

The top cloth can also be connected fixedly to the frame, for example by adhesive bonding, sewing and/or welding.

Both embodiments can be combined with each other, i.e. the frame can be connected to the rear window and to the top cloth. This relieves the load on the window mount between the rear window and the top cloth. However, in a preferred embodiment, only the rear window is connected fixedly to the frame while only as the top cloth takes up the closed position does it come into contact with the frame and is supported and tensioned by the latter.

Other features which are considered as characteristic for the invention are set forth in the appended claims.

Although the invention is illustrated and described herein as embodied in a foldable vehicle top, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF A PREFERRED EMBODIMENT OF THE INVENTION

Figure 1:
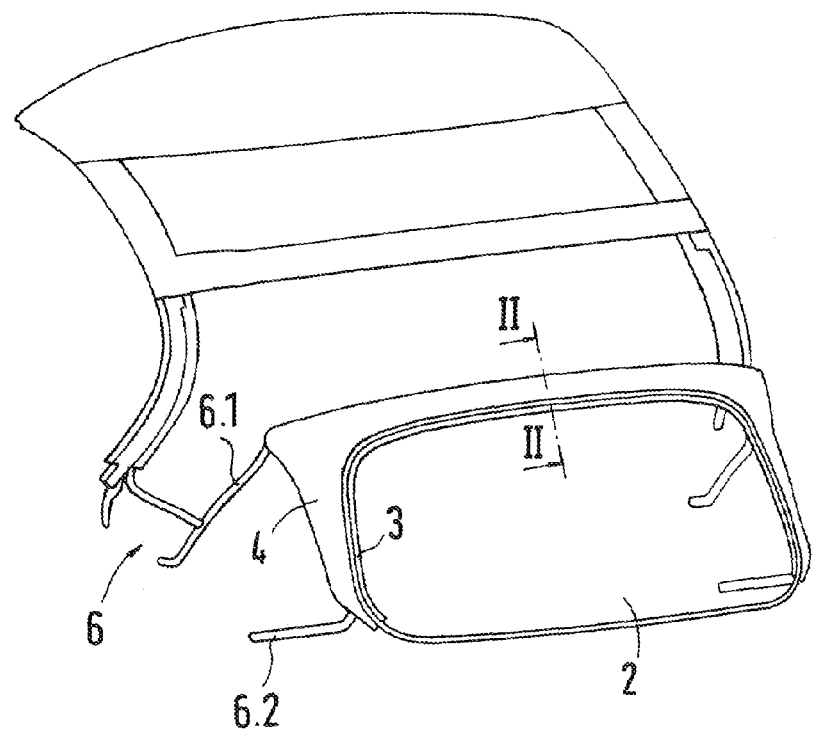
FIG. 1 is a diagrammatic, perspective view of a foldable vehicle top according to one embodiment of the invention.
Figure 2:
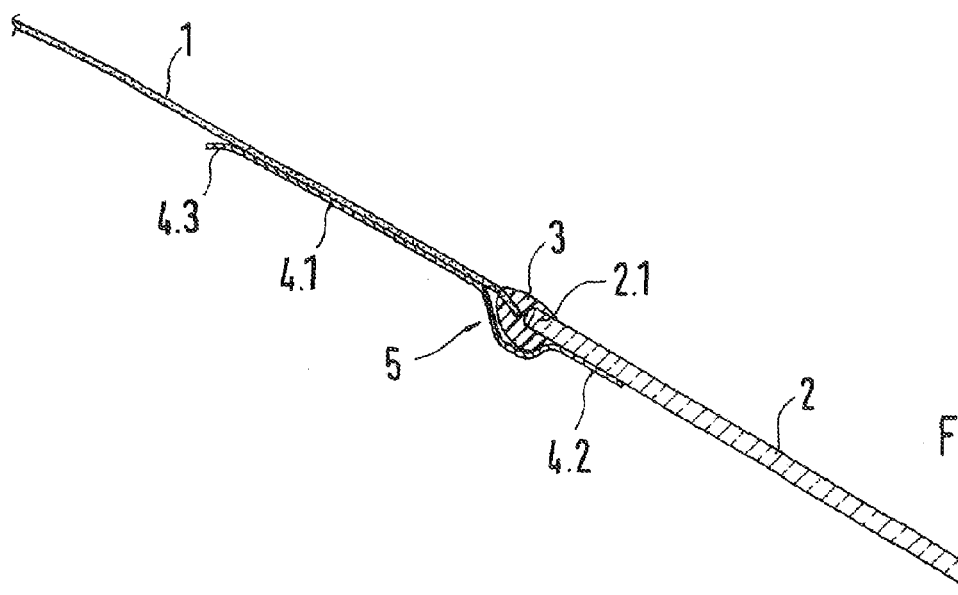
FIG. 2 is a diagrammatic, sectional view taken along the line II-II shown in FIG. 1.

Referring now to the figures of the drawing in detail and first, particularly, to FIG. 1 thereof, there is shown a vehicle top according to one embodiment of the present invention. For clarification purposes, a top cloth 1 which is visible in FIG. 2 is omitted here in order to show a top framework 6 and, in particular, a frame 4.

The vehicle top contains a transparent rear window 2 made of glass which is adhesively bonded along its upper and side edges and from above onto a second supporting surface 4.2 of the frame 4. The metallic frame 4 is coupled to the top framework 6 via two links 6.1, 6.2 in such a manner that it is moved from a non-illustrated storage position, in which it is accommodated together with the rear window 2 in a top compartment of the vehicle, into the closed position shown in the figures and, in the process, positions the rear window 2 in its final position.

A window mount 3 surrounds an outer border 2.1 of the rear window 2 generally in the region of the frame 4. A border of the top cloth 1, which is shown in FIG. 2, is integrated on the other side of the window mount 3, which side faces away from the rear window 2. For this purpose, the outer border 2.1 of the rear window and the border region of the top cloth 1 are placed together into a mold and encapsulated with a plastics material which, after cooling and curing, forms the window mount 3.

The border of the fabric top cloth 1 is reinforced by a non-illustrated plastic strip which is adhesively bonded onto it, is angled and is at least partially integrated into the window mount 3. The outer border 2.1 of the rear window 2 has a plurality of fir tree-shaped projections (not visible in the figures) which are likewise embedded in the window mount 3. This configuration of the border regions advantageously reinforces the connection of the window mount 3 to the top cloth 1 and the rear window 2.

As can be seen in FIG. 2, the frame 4 is configured as an open profile with a first supporting surface 4.1 and with the second supporting surface 4.2 which are connected to each other by a trough which defines a recess 5 in which the window mount 3 is supported by part of its surface with a form-fitting connection. While the frame 4 is connected fixedly at its second supporting surface 4.2 to the rear window 2 by adhesive bonding, its first supporting surface 4.1 comes into contact with the top cloth 1 and tensions the latter only as it takes up the closed position. For this purpose, the first supporting surface 4.1, as can be seen in FIG. 1, is widened and angled to the side at the upper corner regions of the frame 4, and therefore the frame 4 takes on the function of a corner bow which tensions and shapes the top cloth 1.

In order to avoid the stress concentration of a sharp edge which could damage the top cloth 1 during its slight movements induced by the relative wind, the first supporting surface 4.1 is angled at its end 4.3 which faces away from the trough toward the inside of the vehicle, and therefore, in the closed position, it does not come into contact with the top cloth in its ideal contour. This rounding 4.3 also prevents damage to the top cloth 1 while the frame 4 comes into contact with the latter and tensions it into the closed position.

The invention claimed is:

1. A foldable vehicle top, comprising:
 a top cloth including an upper region and a lateral region;
 a rear window having an outer border;
 a window mount fastened to said outer border and to said top cloth;
 a frame, in a closed position said frame supports said top cloth and said rear window, said frame has a recess formed therein in which said window mount is accommodated in the closed position; and
 a top linkage having a link connected to said frame;
 said frame supports at least one of said upper region and said lateral region of said top cloth in the closed position;
 said frame including a supporting surface for said top cloth, sides and upper corner regions that are widened toward said sides to enlarge said supporting surface.

2. The vehicle top according to claim 1, wherein at least one of said rear window and said top cloth is fastened non-releasably to said window mount.

3. The vehicle top according to claim 2, wherein said window mount is formed from plastic, and at least one of said rear window and said top cloth is one of foamed into said window mount and encapsulated in said window mount by injection molding.

4. The vehicle top according to claim 1, wherein said window mount engages around said outer border of said rear window in a bead-shaped manner.

5. The vehicle top according to claim 1, wherein said window mount engages in said recess in a form-fitting manner.

6. The vehicle top according to claim 1, wherein said frame has at least one of a traverse limb and at least one side limb.

7. The vehicle top according to claim 1, wherein said frame is an open profile having a first supporting surface for supporting said top cloth, a second supporting surface for supporting said rear window, and a trough which connects said first and second supporting surfaces and forms said recess.

8. The vehicle top according to claim 7, wherein said first supporting surface is angled at an end facing away from said trough toward an inside of a vehicle.

9. The vehicle top according to claim 1, wherein in the closed position, said frame supports said top cloth and said rear window from an inside of a vehicle.

10. The vehicle top according to claim 1, wherein said frame is connected fixedly to at least one of said rear window and said top cloth.

11. The vehicle top according to claim 1, wherein said window mount engages around said outer border of said rear window, including along at least one of an upper outer border and a lateral outer border, in a bead-shaped manner.

12. The vehicle top according to claim 1, wherein the vehicle top is a top for a passenger vehicle.

13. The vehicle top according to claim 1, wherein said frame, in an upper corner region of said rear window, supports at least one of said upper region and said lateral region of said top cloth in the closed position.

14. The vehicle top according to claim 1, wherein said frame is configured to tension and shape said top cloth like a corner bow.

\* \* \* \* \*